United States Patent
Park et al.

(10) Patent No.: US 10,401,197 B2
(45) Date of Patent: Sep. 3, 2019

(54) APPARATUS AND METHOD FOR COMPENSATING FOR POSITION ERROR OF RESOLVER

(71) Applicant: Hyundai Motor Company, Seoul (KR)

(72) Inventors: Joo Young Park, Seoul (KR); Han Hee Park, Gyeonggi-Do (KR); Tae Il Yoo, Gyeonggi-Do (KR); Byung Hoon Yang, Gyeonggi-Do (KR); Chin Wook Paek, Gyeonggi-Do (KR); Hyung Bin Ihm, Seoul (KR)

(73) Assignee: Hyundai Motor Company, Seoul (KR)

( * ) Notice: Subject to any disclaimer, the term of this patent is extended or adjusted under 35 U.S.C. 154(b) by 799 days.

(21) Appl. No.: 14/570,294

(22) Filed: Dec. 15, 2014

(65) Prior Publication Data

US 2015/0362347 A1    Dec. 17, 2015

(30) Foreign Application Priority Data

Jun. 11, 2014  (KR) .................. 10-2014-0070911

(51) Int. Cl.
| | | |
|---|---|---|
| *H02P 6/00* | (2016.01) | |
| *G01D 5/244* | (2006.01) | |
| *G01D 5/20* | (2006.01) | |

(52) U.S. Cl.
CPC ........... *G01D 5/24495* (2013.01); *G01D 5/20* (2013.01)

(58) Field of Classification Search
None
See application file for complete search history.

(56) References Cited

U.S. PATENT DOCUMENTS

| | | | | |
|---|---|---|---|---|
| 8,686,671 B2* | 4/2014 | Jeon | ................... | H02P 23/0077 318/400.01 |
| 8,898,030 B2* | 11/2014 | Ihm | ........................ | G01B 21/00 702/94 |

(Continued)

FOREIGN PATENT DOCUMENTS

| | | |
|---|---|---|
| CN | 103036499 A | 4/2013 |
| JP | 2001-165707 A | 6/2001 |

(Continued)

OTHER PUBLICATIONS

Kim, Youn-Hyun et al., "Software Resolver-to-Digital Converter for Compensation of Amplitude Imbalances using D-Q Transformation", Jrl. of Electrical Engineering & Technology (Apr. 18, 2013) vol. 8, No. 6, pp. 1310-1319, ISSN (Print) 1975-0102, ISSN (Online) 2093-7423.

*Primary Examiner* — Ali Naraghi
(74) *Attorney, Agent, or Firm* — Mintz Levin Cohn Ferris Glovsky and Popeo, P.C.; Peter F. Corless

(57) ABSTRACT

An apparatus and method are provided for compensating for a position error of a resolver that compensates for positions in the overall speed range using resolver position error measured at a specific speed by providing an angle tracking observer (ATO) for calculating angle information. The ATO compensates for the position errors in the overall speed range based on the position errors measured at the specific speed, to an inside of a resolver-digital converter. The method includes digitalizing detected position information of the motor rotor and receiving the digitalized position information from a resolver-digital converter to measure the position error. An electrical angular velocity of the position error is determined and the position error at the electrical angular velocity 0 is calculated and stored. The position error at a current electrical angular velocity is converted into (Continued)

and compensated for using the calculated position error based on the current electrical angular velocity.

5 Claims, 2 Drawing Sheets

(56) References Cited

U.S. PATENT DOCUMENTS

| | | |
|---|---|---|
| 2009/0187372 A1* | 7/2009 | Mienkina .............. H03M 1/645 702/151 |
| 2011/0260663 A1 | 10/2011 | Jeon et al. |
| 2012/0143549 A1 | 6/2012 | Ihm et al. |

FOREIGN PATENT DOCUMENTS

| | | |
|---|---|---|
| KR | 10-1995-0015930 A | 6/1995 |
| KR | 10-0876658 | 1/2009 |
| KR | 10-2009-0128167 A | 12/2009 |
| KR | 10-2012-0059956 | 6/2012 |
| KR | 10-2014-0078955 | 7/2013 |

* cited by examiner

APPARATUS AND METHOD FOR COMPENSATING FOR POSITION ERROR OF RESOLVER

CROSS-REFERENCE TO RELATED APPLICATION

This application is based on and claims the benefit of priority to Korean Patent Application No. 10-2014-0070911, filed on Jun. 11, 2014 in the Korean Intellectual Property Office, the disclosure of which is incorporated herein in its entirety by reference.

TECHNICAL FIELD

The present disclosure relates to an apparatus and a method for compensating for a position error of a resolver, and more particularly, to a technology of using a position error of a resolver measured at a specific speed.

BACKGROUND

To drive a permanent magnet synchronous motor using a vector control, accurate rotor position information is required. In particular, an absolute position of the rotor may be detected using a resolver. However, an unbalance of a magnitude of a signal may occur due to a difference in a transformation ratio of the resolver, an unbalance exciting signal, a non-uniform inductance component, a distortion of a signal processing circuit, and the like, and thus error components may periodically occur in the position information. Therefore, motor control performance deteriorates and thus the motor is restrictively used in a high performance field.

As an existing method to reduce the position error in the resolver, a method has been developed for recording the error information previously measured by a precision position sensor in a memory such as a read only memory in a table form and compensating for the position error based thereon. Further, a method has been developed for modeling an output signal of a resolver using a regression equation and then estimating model parameters using a recursive least square method to minimize an error between a model value and a measurement value to compensate for the output signal of the resolver.

However, the methods for compensating for the position error of the resolver according to the related art are a method for measuring a position error when a speed is constant and have a limitation in compensating for the position error in the overall speed range.

SUMMARY

An aspect of the present disclosure provides an apparatus and a method for compensating for a position error of a resolver capable of compensating for positions in the overall speed range using the position error of the resolver measured at a specific speed by providing an angle tracking observer (ATO) for calculating angle information, which is a technology of compensating for the position errors in the overall speed range based on the position errors measured at the specific speed, to an inside of a resolver-digital converter and detecting ATO characteristics.

According to an exemplary embodiment of the present disclosure, an apparatus for compensating for a position error of a resolver may include: a position error learner configured to digitalize position information of a motor rotor detected by a resolver, receive the digitalized position information to measure the position error, determine an electrical angular velocity of the position error, and calculate and store the position error at the electrical angular velocity $0$; and a position error compensator configured to convert into and compensate for the position error at a current electrical angular velocity using the position error stored in the position error learner based on the current electrical angular velocity.

The position error learner may include: a position error measurer configured to receive the digitalized position information to measure the position error; a speed determiner configured to determine the electrical angular velocity of the position error; a position error calculator configured to calculate the position error at the electrical angular velocity $0$; and a storage unit configured to store the calculated position error. In addition, the position error compensator may include: a speed determiner configured to determine the current electrical angular velocity; a storage unit configured to include the position error calculated by the position error learner; and a position error converter configured to convert the position error at the current electrical angular velocity using the current electrical angular velocity and the position error stored in the storage unit.

The apparatus may further include: a resolver-digital converter configured to digitalize the position information regarding the motor rotor, wherein an inside of the resolver-digital converter may be provided with an angle tracking observer (ATO).

According to another exemplary embodiment of the present disclosure, an method for compensating for a position error of a resolver may include: detecting position information regarding a motor rotor; digitalizing and outputting the position information; measuring the position error using the digitalized position information; determining an electrical angular velocity at the position error; calculating the position error at the electrical angular velocity $0$; storing the calculated position error; and converting into and compensating for the position error at the current electrical angular velocity using the position error calculated based on the current electrical angular velocity.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
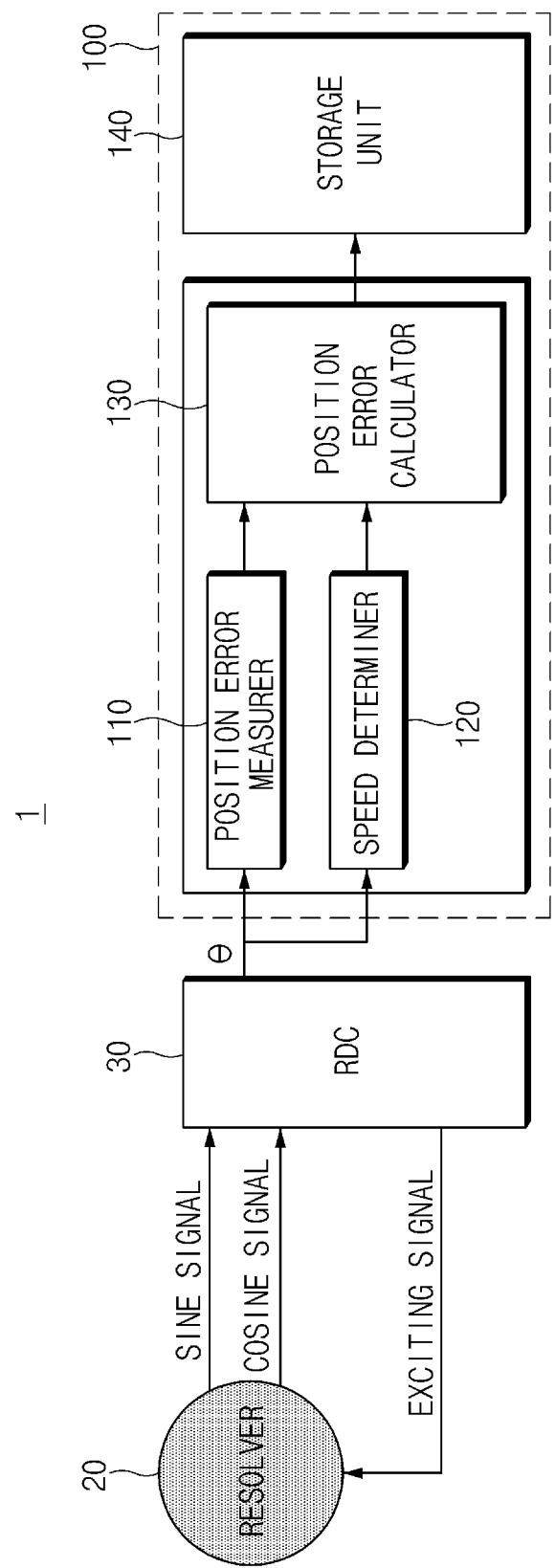
FIG. 1 is an exemplary configuration diagram for describing a position error learner according to an exemplary embodiment of the present invention.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

The foregoing objects, features and advantages will become more apparent from the following description of exemplary embodiments of the present disclosure with reference to accompanying drawings, which are set forth hereinafter. Accordingly, those having ordinary knowledge in the related art to which the present disclosure pertains will easily embody technical ideas or spirit of the present disclosure. Further, when technical configurations known in the related art are considered to make the contents obscure in the present disclosure, the detailed description thereof will be omitted. Hereinafter, exemplary embodiments of the present disclosure will be described in detail with reference to the accompanying drawings.

An apparatus for compensating for a position error of a resolver according to an exemplary embodiment of the present disclosure may include a position error learner and a position error compensator. The position error of the resolver is a periodic error component of position component occurring due to an unbalance of an SIN signal and a COS signal generated due to a difference in a transformation ratio of the resolver, an unbalance exciting signal, a non-uniform inductance component, a distortion of a signal processing circuit, and the like.

FIG. 1 is an exemplary configuration diagram for describing a position error learner according to an exemplary embodiment of the present disclosure. Referring to FIG. 1, the position error learner 100 may include a position error measurer 110, a speed determiner 120, a position error calculator 130, and a storage unit 140. In particular, a processor may be configured to operate the position error learner and the components thereof. A system 1 for compensating for the position error of the resolver may further include a resolver 20 and a resolver-digital converter 30.

The resolver 20 may be executed by the processor to detect an absolute position of a rotor of a motor such as a permanent magnet synchronous motor. Accordingly, the resolver 20 may be operated by a reference voltage for excitation amplified by an amplifier. The position information detected by the resolver 20 may be output by the processor output to the resolver-digital converter 30 as a sine signal and a cosine signal. The resolver-digital converter 30 may be configured to digitalize and output the position information. The digitalized position information may be input to the position error measurer 110. The position error measurer 110 may be configured to receive the digitalized position information to measure the position error. The speed determiner 120 may be configured to determine an electrical angular velocity of the measured position error.

For example, an N-order position error component at a specific electrical angular velocity $\omega_{target}$ may be measured by the following Equation.

$$M_{N@N\omega_{TARGET}} \cos(N\omega_{TARGET} T - \Phi_{N@N\omega_{TARGET}})$$

In the above Equation $M_N$ represents an amplitude of an N-order position error, $\phi_N$ represents a phase of the N-order position error, and $\omega$ represents the electrical angular velocity and may be obtained by dividing an order based on an electrical angle period, and therefore an N value may not be an integer.

Further, $M_N$ and $\phi_N$ have a value changed in response to a change in the electrical angular velocity according to a design of an angle tracking observer (ATO) inside the resolver-digital converter. In other words, the present technology may compensate for $M_N$ and $\phi_N$ changed in response to the electrical angular velocity to compensate for the position error in the overall speed range based on the position error measured at the specific speed.

Further, $M_{N@N\omega_{TARGET}}$ and $\Phi_{N@N\omega_{TARGET}}$ are the amplitude and the phase of the N-order position error at the specific electrical angular velocity.

The position error calculator 130 may be configured to calculate the position error at the electrical angular velocity 0. In particular, a method for calculating the position error at the electrical angular velocity 0 may be as follows.

$$M_{N@ELECTRICAL\ ANGULAR\ VELOCITY\ 0} = \frac{M_{N@N\omega_{TARGET}}}{ATO_{AMPLITUDE\ RATIO\ @N\omega_{TARGET}}}$$

$$\phi_{N@ELECTRICAL\ ANGULAR\ VELOCITY\ 0} = \phi_{N@N\omega_{TARGET}} - ATO\ PHASE\ DIFFERENCE\ @N\omega_{TARGET}$$

The storage unit 140 may be configured to store the position error at the calculated electrical angular velocity 0. For example, the position error learner 100 may be configured to measure the position error of the resolver at an electrical angular frequency 200 Hz and then compensate for the position error in the overall speed range based on the measured value.

Figure 2:
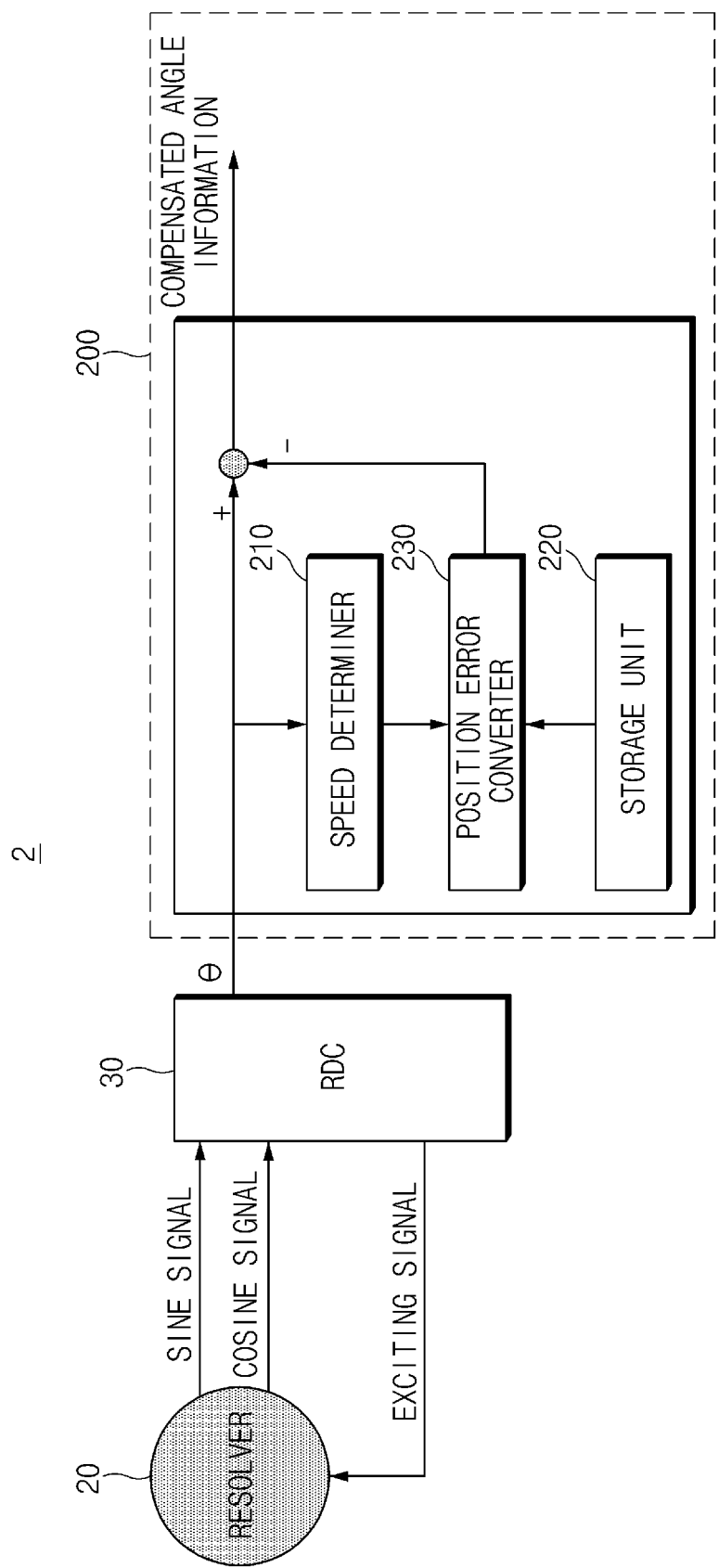
FIG. 2 is an exemplary configuration diagram for describing a position error compensator according to an exemplary embodiment of the present invention.

FIG. 2 is an exemplary configuration diagram for describing a position error compensator according to an exemplary embodiment of the present disclosure. Referring to FIG. 2, the position error compensator 200 may include a speed determiner 210, a storage unit 220, and a position error converter 230. The processor may be configured to operate the position error compensator 200 and the components thereof. A system 2 for compensating for the position error of the resolver may further include the resolver 20 and the resolver-digital converter 30.

The speed determiner 210 may be configured to determine a current electrical angular velocity. The storage unit 220 may represent the position error stored in the position error learner 100, that is, the N-order position error at the calculated electrical angular velocity 0. The position error converter 230 may use the current electrical angular velocity determined by the speed determiner 210 and the position error stored in the storage unit 220 to convert the position error of the current electrical angular velocity. The method for converting the position error at the current electrical angular velocity may be as follows.

$$M_{N@N\omega} = \text{STORED } M_{N@ELECTRICAL\ ANGULAR\ VELOCITY\ 0 \times ATO\ AMPLITUDE\ RATIO@N\omega}$$

$$\Phi_{N@N\omega} = \text{STORED}\Phi_{N@ELECTRICAL\ ANGULAR\ VELOCITY\ 0 + ATO\ PHASE\ DIFFERENCE@N\omega}$$

The N-order position error obtained by the above Equations may be calculated by the following Equation.

$$N\text{-ORDER POSITION ERROR COMPONENT AT ELECTRICAL ANGULAR VELOCITY}_\omega = \text{STORED}^{M}N@\text{ELECTRICAL ANGULAR VELOCITY } 0 \times ATO \text{ AMPLITUDE RATIO}_{@N\omega} \cos(N\omega T - (\text{STORED}_{\Phi N@ELECTRICAL\ ANGULAR\ VELOCITY\ 0 + ATO} \text{ PHASE DIFFERENCE}_{\Phi N\omega}))$$

When the position error calculated by the above Equation is compensated, the compensation may be made in the overall speed range.

As described above, according to the exemplary embodiments of the present disclosure, it may be possible to more easily compensate for the position error of the resolver and be automatically adapted the deviation between products. In particular, it may be possible to reduce the speed ripple in the overall speed range based on the position error measured at the specific speed.

Although the exemplary embodiments of the present disclosure have been disclosed based on restricted configuration and drawings, the technical ideas of the present disclosure are not limited thereto. Therefore, those skilled in the art will appreciate that various modifications and changes may be made, without departing from the scope and spirit of the disclosure as disclosed in the accompanying claims.

What is claimed is:

1. An apparatus for compensating for a position error of a resolver, comprising:
    a memory configured to store program instructions;
    a processor configured to execute the program instructions, the program instructions when executed configured to:
        digitalize position information of a motor rotor detected by a resolver using a resolver-digital converter;
        receive the digitalized position information to measure a first position error;
        determine a first electrical angular velocity at the first position error;
        calculate and store in the memory a reference position error when an electrical angular velocity is zero, based on the first position error; and
        convert into and compensate for a second position error at a second electrical angular velocity using the stored reference position error when the motor rotor operates at the second electrical angular velocity; and
    a position error compensator configured to compensate for an amplitude and a phase of the second position error changed in response to the second electrical angular velocity according to an angle tracking observer (ATO) inside the resolver-digital converter and output a compensated value to an overall speed range of the resolver,
    wherein the amplitude and the phase of the second position error are calculated by:

$$M_{N@N\omega} = \text{STORED } M_{N@ELECTRICAL\ ANGULAR\ VELOCITY\ 0 \times ATO\ AMPLITUDE\ RATIO@N\omega}$$

and $$\Phi_{N@N\omega} = \text{STORED}\Phi_{N@ELECTRICAL\ ANGULAR\ VELOCITY\ 0 + ATO\ PHASE\ DIFFERENCE@N\omega}$$

wherein $M_N$ represents an amplitude of an N-order position error, $\phi_N$ represents a phase of the N-order position error, $\omega$ represents the electrical angular velocity, and $M_N$ and $\phi_N$ vary based on the electrical angular velocity according to the ATO in the resolver-digital converter.

2. The apparatus according to claim 1, wherein the program instructions when executed are further configured to:
    receive the digitalized position information to measure the first position error;
    determine the first electrical angular velocity at the first position error;
    calculate the reference position error when the electrical angular velocity is zero, based on the first position error; and
    store the calculated reference position error.

3. The apparatus according to claim 1, wherein the program instructions when executed are further configured to:
    determine the second electrical angular velocity; and
    convert the second position error at the second electrical angular velocity using the second electrical angular velocity and the stored reference position error.

4. A method for compensating for a position error of a resolver, comprising:
    detecting, by a processor, position information of a rotor of a motor;
    digitalizing and outputting, by the processor, the position information using a resolver-digital converter;
    measuring, by the processor, a first position error using the digitalized position information;
    determining, by the processor, a first electrical angular velocity at the first position error;
    calculating, by the processor, a reference position error when an electrical angular velocity is zero, based on the first position error;
    storing, by the processor, the calculated reference position error;
    converting into and compensating for, by the processor, a second position error at a second electrical angular velocity using the stored reference position error when the motor rotor operates at the second electrical angular velocity;
    compensating for, by a position error compensator, an amplitude and a phase of the second position error changed in response to the second electrical angular velocity according to an angle tracking observer (ATO) inside the resolver-digital converter; and
    outputting, by the position error compensator, a compensated value to an overall speed range of the resolver,
    wherein the amplitude and the phase of the second position error are calculated by:

$$M_{N@N\omega}=\text{STORED } M_{N@ELECTRICAL\ ANGULAR\ VELOCITY\ 0 \times ATO\ AMPLITUDE\ RATIO@N\omega}$$

and $$\Phi_{N@N\omega}=\text{STORED}\Phi_{N@ELECTRICAL\ ANGULAR\ VELOCITY\ 0+ATO\ PHASE\ DIFFERENCE@N\omega}$$

wherein $M_N$ represents an amplitude of an N-order position error, $\phi_N$ represents a phase of the N-order position error, $\omega$ represents the electrical angular velocity, and $M_N$ and $\phi_N$ vary based on the electrical angular velocity according to the ATO in the resolver-digital converter.

5. A non-transitory computer readable medium containing program instructions executed by a processor, the computer readable medium comprising:

program instructions that detect position information of a rotor of a motor;

program instructions that digitalize and output the position information using a resolver-digital converter;

program instructions that measure a first position error using the digitalized position information;

program instructions that determine a first electrical angular velocity at the first position error;

program instructions that calculate a reference position error when an electrical angular velocity is zero, based on the first position error;

program instructions that store the calculated reference position error;

program instructions that convert into and compensate for a second position error at a second electrical angular velocity using the stored reference position error when the motor rotor operates at the second electrical angular velocity; and program instructions that compensate for an amplitude and a phase of the second position error changed in response to the second electrical angular velocity according to an angle tracking observer (ATO) inside the resolver-digital converter and output a compensated value applicable to an overall speed range of the resolver, wherein the amplitude and the phase of the second position error are calculated by:

$$M_{N@N\omega}=\text{STORED } M_{N@ELECTRICAL\ ANGULAR\ VELOCITY\ 0 \times ATO\ AMPLITUDE\ RATIO@N\omega}$$

and $$\Phi_{N@N\omega}=\text{STORED}\Phi_{N@ELECTRICAL\ ANGULAR\ VELOCITY\ 0+ATO\ PHASE\ DIFFERENCE@N\omega}$$

wherein $M_N$ represents an amplitude of an N-order position error, $\phi_N$ represents a phase of the N-order position error, $\omega$ represents the electrical angular velocity, and $M_N$ and $\phi_N$ vary based on the electrical angular velocity according to the ATO in the resolver-digital converter.

\* \* \* \* \*